(12) United States Patent
Fakhoury

(10) Patent No.: US 11,180,058 B2
(45) Date of Patent: Nov. 23, 2021

(54) FOLDABLE SEATING ACCESSORY FOR THE TRUNK OF A VEHICLE

(71) Applicant: Nikolas Fakhoury, Rancho Cucamonga, CA (US)

(72) Inventor: Nikolas Fakhoury, Rancho Cucamonga, CA (US)

(*) Notice: Subject to any disclaimer, the term of this patent is extended or adjusted under 35 U.S.C. 154(b) by 0 days.

(21) Appl. No.: 16/683,147

(22) Filed: Dec. 11, 2019

(65) Prior Publication Data

US 2021/0178940 A1 Jun. 17, 2021

(51) Int. Cl.
| | | |
|---|---|---|
| *A47C 4/52* | (2006.01) |
| *B60N 2/00* | (2006.01) |
| *B60N 2/30* | (2006.01) |
| *A47C 4/28* | (2006.01) |
| *A47C 4/30* | (2006.01) |
| *A47C 3/20* | (2006.01) |

(52) U.S. Cl.
CPC .............. *B60N 2/3031* (2013.01); *A47C 3/20* (2013.01); *A47C 4/30* (2013.01); *A47C 4/52* (2013.01)

(58) Field of Classification Search
CPC ...... B60N 2/3031; B60N 2/3095; A47C 4/52; A47C 3/20; A47C 4/30
USPC ....................................... 296/65.03; 297/16.1
See application file for complete search history.

(56) References Cited

U.S. PATENT DOCUMENTS

| | | | | |
|---|---|---|---|---|
| 2,601,888 A * | 7/1952 | Schopper | ............. | B60N 2/3095 248/214 |
| 2,612,207 A * | 9/1952 | Branson | ............... | B60N 2/3011 297/331 |
| 2,698,048 A * | 12/1954 | Schweizer | ........... | A47C 15/004 248/214 |
| 2,781,081 A * | 2/1957 | Hynes | .................. | B60N 2/3095 248/214 |
| 2,834,398 A * | 5/1958 | Thelen | ................. | B60N 2/3095 297/147 |
| 3,289,611 A * | 12/1966 | Flanders | ............... | A47C 15/004 108/44 |
| 3,552,788 A * | 1/1971 | Christensen | ......... | B60N 2/3095 296/64 |
| 3,865,431 A * | 2/1975 | Zakhi | .................... | B60N 2/3097 297/217.1 |
| 5,087,093 A * | 2/1992 | Repetti | ..................... | B60J 7/141 296/100.09 |
| 5,197,381 A * | 3/1993 | Mells | ..................... | B60N 3/001 108/44 |
| 5,462,334 A * | 10/1995 | Sedorcek | ................. | A47C 9/06 297/252 |
| 6,095,059 A * | 8/2000 | Riley | ....................... | B60N 2/00 108/152 |
| 6,196,612 B1 * | 3/2001 | Grimes | ................ | B60N 2/3011 293/117 |
| 6,364,391 B1 * | 4/2002 | Everett | .................... | B60N 2/24 296/51 |

(Continued)

*Primary Examiner* — Rodney B White

(74) *Attorney, Agent, or Firm* — The Lewental Firm; Adam Lewental

(57) ABSTRACT

A foldable seating accessory for a vehicle comprising a backrest assembly, a seat assembly, and a rear support. The backrest assembly is connected by a hinge joint to the seat assembly. The rear support is connected by a hinge joint to the backrest assembly. A trunk latch is connected to the seat assembly, allowing the seat assembly to secure onto the trunk of a vehicle. Other aspects are also described and claimed.

14 Claims, 7 Drawing Sheets

(56) References Cited

U.S. PATENT DOCUMENTS

| | | | | |
|---|---|---|---|---|
| 7,201,424 | B1* | 4/2007 | Fournier | B62D 33/0273 296/57.1 |
| 7,513,557 | B2* | 4/2009 | Leigh-Monstevens | B60N 2/015 296/57.1 |
| 8,123,271 | B1* | 2/2012 | Wimberley | B60N 2/3095 296/63 |
| 8,528,976 | B2* | 9/2013 | Wimberley | B60N 2/22 297/352 |
| 9,211,012 | B1* | 12/2015 | Wilson, II | A47C 7/407 |
| 9,272,648 | B1* | 3/2016 | Kupec | B60N 2/01508 |
| 9,469,215 | B2* | 10/2016 | Mason | B60N 2/01508 |
| 9,701,225 | B1* | 7/2017 | Hogan | B60N 2/3095 |
| 2005/0264048 | A1* | 12/2005 | Collins | B60N 2/3095 297/188.01 |
| 2007/0057526 | A1* | 3/2007 | Bigelow | B60N 2/3095 296/65.03 |
| 2008/0122240 | A1* | 5/2008 | Leroy | B60R 5/041 296/37.6 |

* cited by examiner

FOLDABLE SEATING ACCESSORY FOR THE TRUNK OF A VEHICLE

FIELD

An aspect of the disclosure here relates to a foldable seat that interfaces with a vehicle. Other aspects are also described.

BACKGROUND

Automobiles are conventionally used as a form of transportation in which a driver and potentially passengers operate the vehicle from a starting point to a destination. These vehicles may serve other purposes, some of which are considered by the automobile designers. For instance, a pickup truck is configured to allow a user to haul cargo in an open-air cargo bed.

Other times, users may become creative with the use of otherwise designated aspects of vehicles. For instance, the open-air cargo bed of the pickup truck is used in a practice called "tail gating." Tail gating is a social gathering usually associated with sporting events in which a group of people prepare and/or consume an informal meal from the back of a parked vehicle. The open and lifted nature of the cargo bed of the pickup truck makes it ideal for using as a surface for associated activities like food prep and grilling.

In this spirit, it may be desirable for a vehicle owner to be able to use their vehicle for comfortable open-air seating, especially for vehicles that do not have this feature natively.

SUMMARY

The vehicle seat accessory provides a comfortable place for a user to sit within the trunk of a vehicle with a small footprint during non-use. The vehicle seat accessory lays flat within the trunk of the vehicle during storage. The vehicle seat accessory is designed to be easily operable by the user, such that the processes of assembly and disassembly are intuitive and simple. Further, the vehicle seat accessory is designed to distribute the weight of the user to the vehicle itself in an effective manner and also maintaining the position of the vehicle seat accessory within the trunk, allowing the vehicle seat accessory to be weight-efficient.

In an embodiment, the vehicle seat accessory may include a backrest assembly, a seat assembly, and a rear support. The backrest assembly and seat assembly may be connected by a hinge such that the backrest assembly and seat assembly may be folded together when not in use and folded open when use is desired. The rear support may be connected to the seat assembly by a hinge, allowing the rear support and seat assembly to be folded together when not in use and folded to a desired angle to prepare for use. The rear support may lock at an angle from the seat assembly that allows it to stably transfer weight supported by backrest assembly into the floor of the trunk of the vehicle. The vehicle seat accessory may have a trunk latch attached to the seat assembly that may mate with a trunk door locking mechanism, securing the vehicle seat accessory to the vehicle.

In an embodiment, the rear support may be extendable such that the rear support may be adjusted to a desired length.

In an embodiment, the vehicle seat accessory may include a padded foot that serves as a cushion between the bottom of the seat assembly and the surface of the trunk. The padded foot may be adjustable in position and height.

In an embodiment, the backrest assembly may include a backrest frame that holds a backrest.

In an embodiment, the seat assembly may include a seat frame that holds a seat.

The above summary does not include an exhaustive list of all aspects of the present disclosure. It is contemplated that the disclosure includes all systems and methods that can be practiced from all suitable combinations of the various aspects summarized above, as well as those disclosed in the Detailed Description below and particularly pointed out in the Claims section. Such combinations may have particular advantages not specifically recited in the above summary.

BRIEF DESCRIPTION OF THE DRAWINGS

Several aspects of the disclosure here are illustrated by way of example and not by way of limitation in the figures of the accompanying drawings in which like references indicate similar elements. It should be noted that references to "an" or "one" aspect in this disclosure are not necessarily to the same aspect, and they mean at least one. Also, in the interest of conciseness and reducing the total number of figures, a given figure may be used to illustrate the features of more than one aspect of the disclosure, and not all elements in the figure may be required for a given aspect.

DETAILED DESCRIPTION

Several aspects of the disclosure with reference to the appended drawings are now explained. Whenever the shapes, relative positions and other aspects of the parts described are not explicitly defined, the scope of the invention is not limited only to the parts shown, which are meant merely for the purpose of illustration. Also, while numerous details are set forth, it is understood that some aspects of the disclosure may be practiced without these details. In other instances, well-known circuits, structures, and techniques have not been shown in detail so as not to obscure the understanding of this description.

An aspect of the present disclosure is directed toward a foldable seating accessory for a vehicle that includes a chair assembly configured to support the weight of a user, a support structure connected to the seat assembly configured to transmit the weight of the user from the chair assembly to a vehicle trunk, and a means for attaching the foldable seating accessory to the vehicle. The foldable seating accessory may be constructed so as to fit within the vehicle trunk, allowing a user to comfortably sit within the vehicle trunk. Further, the foldable seating accessory may be foldable such that the foldable seating accessory, when folded, can fit within the trunk of the vehicle in a way that minimizes the trunk space needed to store the foldable seating accessory. While example configurations are given, it is understood that variations and modifications may be affected without departing from the spirit and scope of the novel concepts of the disclosure.

Figure 1:
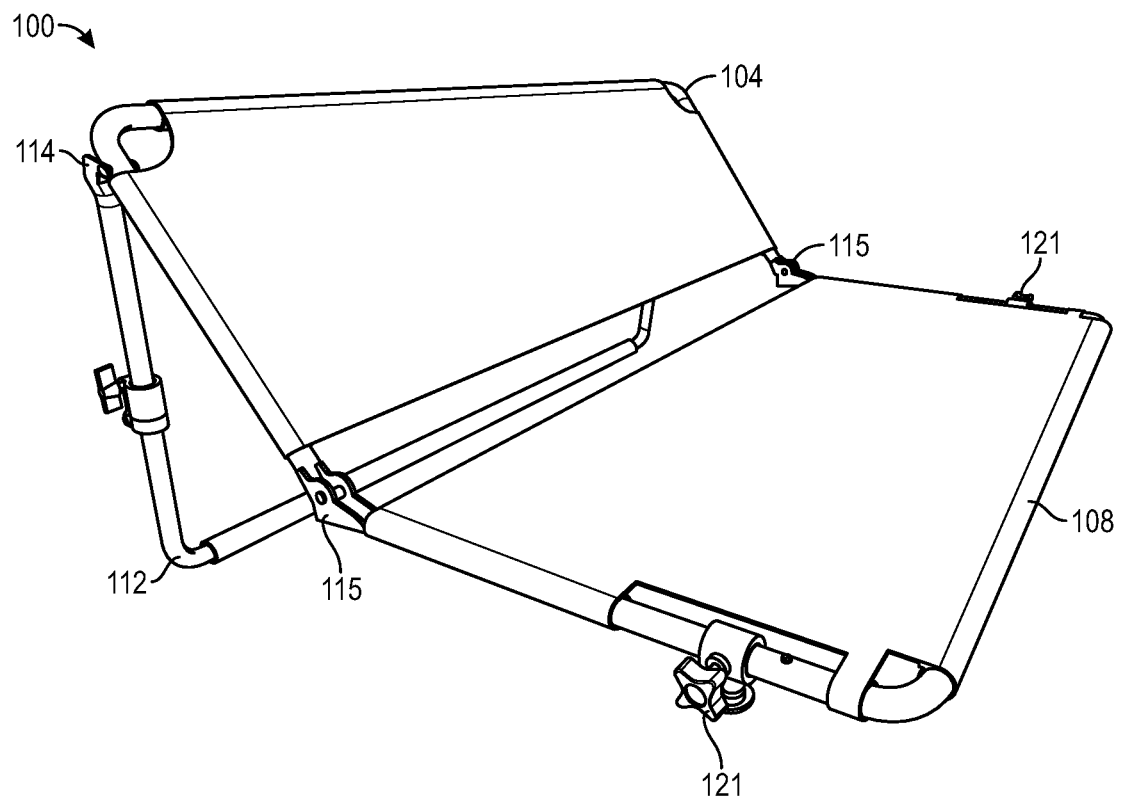
FIG. 1 illustrates a perspective view of an embodiment a foldable seating vehicle accessory.

FIG. 1 demonstrates an embodiment of a foldable seating vehicle accessory 100, wherein the foldable seating vehicle accessory 100 is in an operational state, such that if the foldable seating vehicle accessory 100 were deployed in a trunk of a vehicle and connected to the vehicle (discussed below), the foldable seating vehicle accessory 100 could be sit upon by a user. The foldable seating accessory may include a backrest assembly 104, a seat assembly 108, and a rear support 112. The backrest assembly 104 and the seat assembly 108 may be connected by a tube connector hinge 115 at each attachment point between the frame of the backrest assembly 104 and the frame of the seat assembly 108. The rear support 112 and the backrest assembly 104 may be connected by a hinge joint 115 at each connection point between the backrest assembly 104 and the rear support 112. The foldable seating accessory may include a padded foot 121, which may be attached to a portion of the seat assembly 104.

Figure 2:
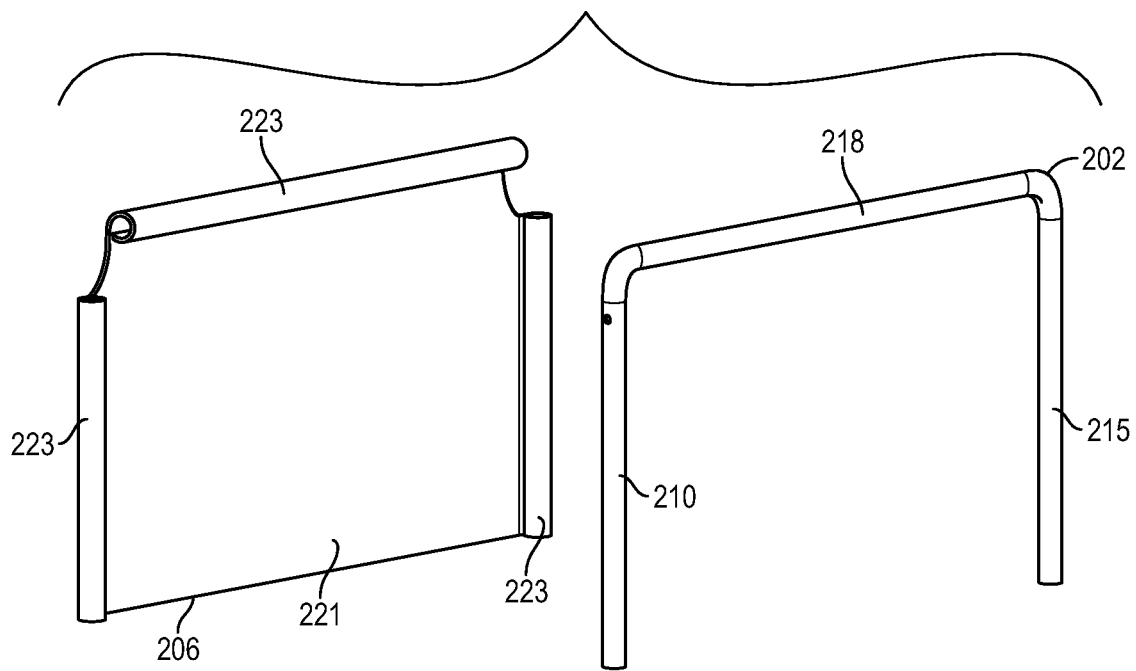
FIG. 2 illustrates an exploded view of an embodiment of a backrest assembly.

FIG. 2 illustrates an embodiment of the bench back assembly 104. The bench back assembly 104 includes a structure for supporting the back of a user in a seated position when using the foldable seating vehicle accessory 100, which here includes a backrest frame 202 and a backrest 206. The backrest frame 202 may act to hold the backrest 206. For example, the backrest frame 202 may be a rectangular structure formed from tubes, such that the tubes form a first side wall 210, a second side wall 215, and a top wall 218, but it is also contemplated that the frame may be formed of any shape without departing from the overall scope of the present embodiment. The backrest 206 may include a weight-bearing surface 221 and an attachment point 223 for securing the backrest 206 to the frame 202. The attachment point 223 may be clips that substantially secure to the frame 202, such as a clip that substantially secures to the first side wall 210, a clip that substantially secures to the second side wall 215, and a clip that may substantially secure to the top wall 218. When the weight-bearing surface 221 is secured to the frame 202, the backrest 206 may be positioned within the frame 202 such that the backrest 206 is capable of bearing weight and distributing some or all of the carried weight to the frame 202. In the illustrated example, the attachment point 223 may be a channel formed from or substantially attached to the weight-bearing surface 221 that is capable of substantially encompassing a wall of the frame 202, such as a pocket or sleeve. A wall of the backrest frame 202 may slide into a corresponding channel connected to the weight-bearing surface 221. When each of the pockets are secured to a corresponding wall, the weight-bearing surface 221 may be substantially fixed to the frame 202.

The weight-bearing surface 221 may be generally composed of a textile or similar material of sufficient strength to support an individual or individuals and the associated force or weight of an individual or individuals thereon, as well as to withstand stresses placed upon the foldable seating vehicle accessory 100. To this end, the weight-bearing surface 221 may be formed of wool, nylon, polyester, canvas, polypropylene, or any other animal, mineral, plant, or synthetic textile. The backrest may also be formed of elastic or stretchable materials, such as spandex or elastane. The weight-bearing surface 221 may also be rigid in nature, such that it may be composed of metals or plastics. The weight-bearing surface 221 may be a single continuous surface such that the weight-bearing surface 221 contains no gaps in the surface of the backrest 206 that spans the frame 202, may be formed of slats, may be formed of cross hatches, or may be any design capable of supporting the comfortably supporting the weight of the user without straying from the inventive concept.

Figure 3:
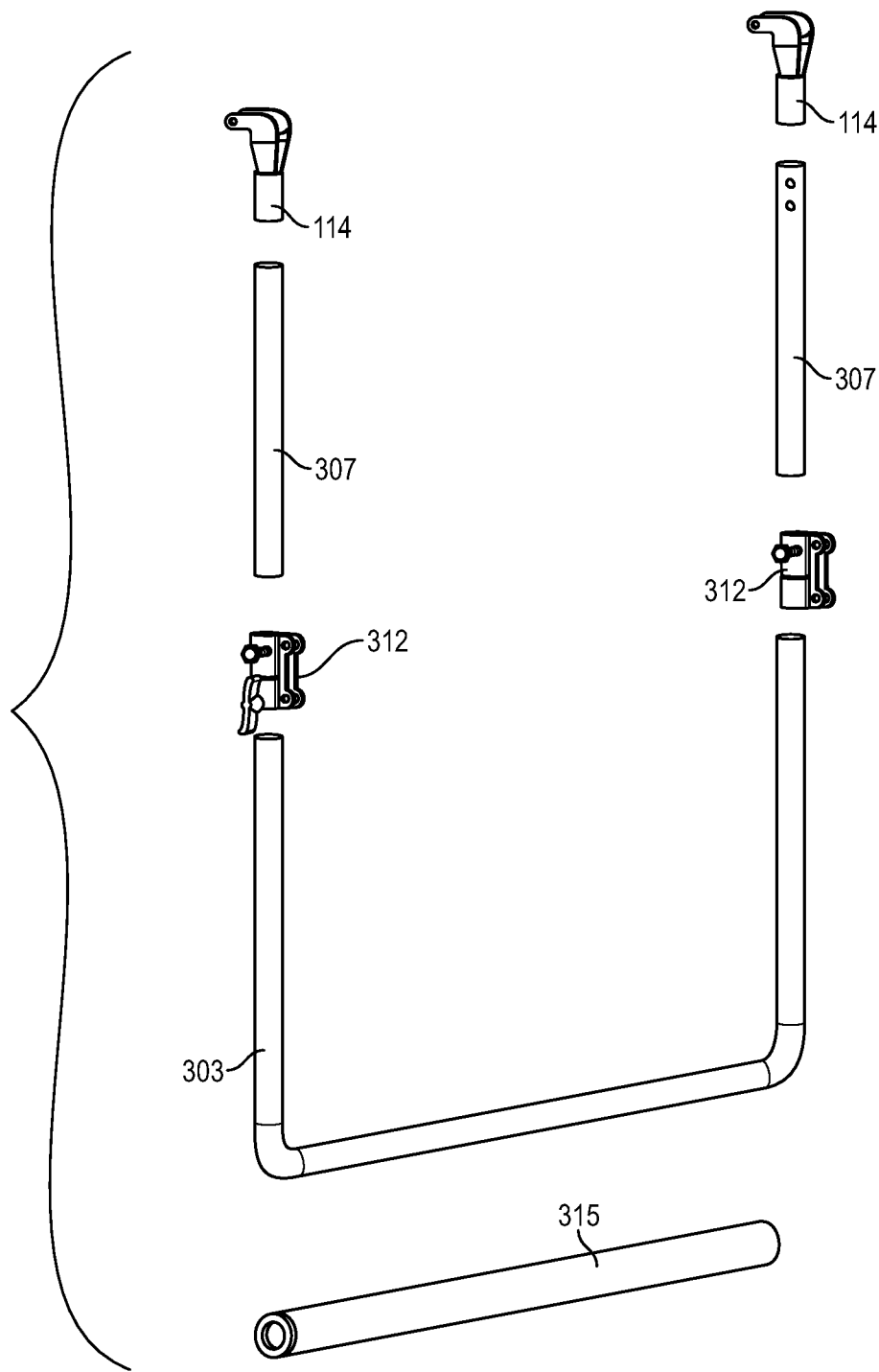
FIG. 3 illustrates an exploded view of an embodiment of a rear support.

FIG. 3 demonstrates an aspect of the rear support 112. The rear support 112 helps to fix the orientation of the bench back assembly 104 by acting as a wedge between the bench back assembly 104 and an inner surface of the trunk of the vehicle. The rear support 112 may be a structure with a means for extending and decreasing in length. For instance, the rear support 112 may include a leg tube 303, an extension tube 307, and a telescoping tube connector 312. When the rear support 112 is in a collapsed position, such that the length of the rear support 112 is at a length less than a maximum possible length, the leg tube 303 may be substantially nested within the extension tube 307. When it is desirable to change the length of the rear support 112, the telescoping tube connector 312 may be operated to allow the leg tube 303 to slide freely within the extension tube 307, such as by decreasing pressure from the extension tube 307 or by a pin mechanism. When the desired length has been reached, the telescoping tube connector 312 may be operated to secure the position of the leg tube 303 within the extension tube 307 such that it is substantially fixed, such as by increase pressure on the extension tube 307. In another example, the extension tube 307 may be substantially nested within the leg tube, such that the extension tube is capable of sliding in and out of the leg tube. The leg tube 303 may be substantially "u" shaped such that the leg tube 303 has a side that may rest on the floor of the trunk of the vehicle while the leg tube 303 is simultaneously in contact with the extension tube 307 at an end of the leg tube 303, although the leg tube 303 may be any number of shapes. For instance, in the shown example, the leg tube 303 at a first end is in contact with a first extension tube 307 and the leg tube 303 at a second end is in contact with a second extension tube 307. The portion of the leg tube 303 that comes into contact with the floor of the trunk of the vehicle may have an exterior cover 315 intended to soften the contact between the leg tube and the floor of the vehicle, such as a foam pad. The exterior cover 315 may be removeable, such as by taking the form of a sleeve that is capable of sliding or unclipping from the leg tube 303, or may be fixed to the leg tube 303.

Figure 4:
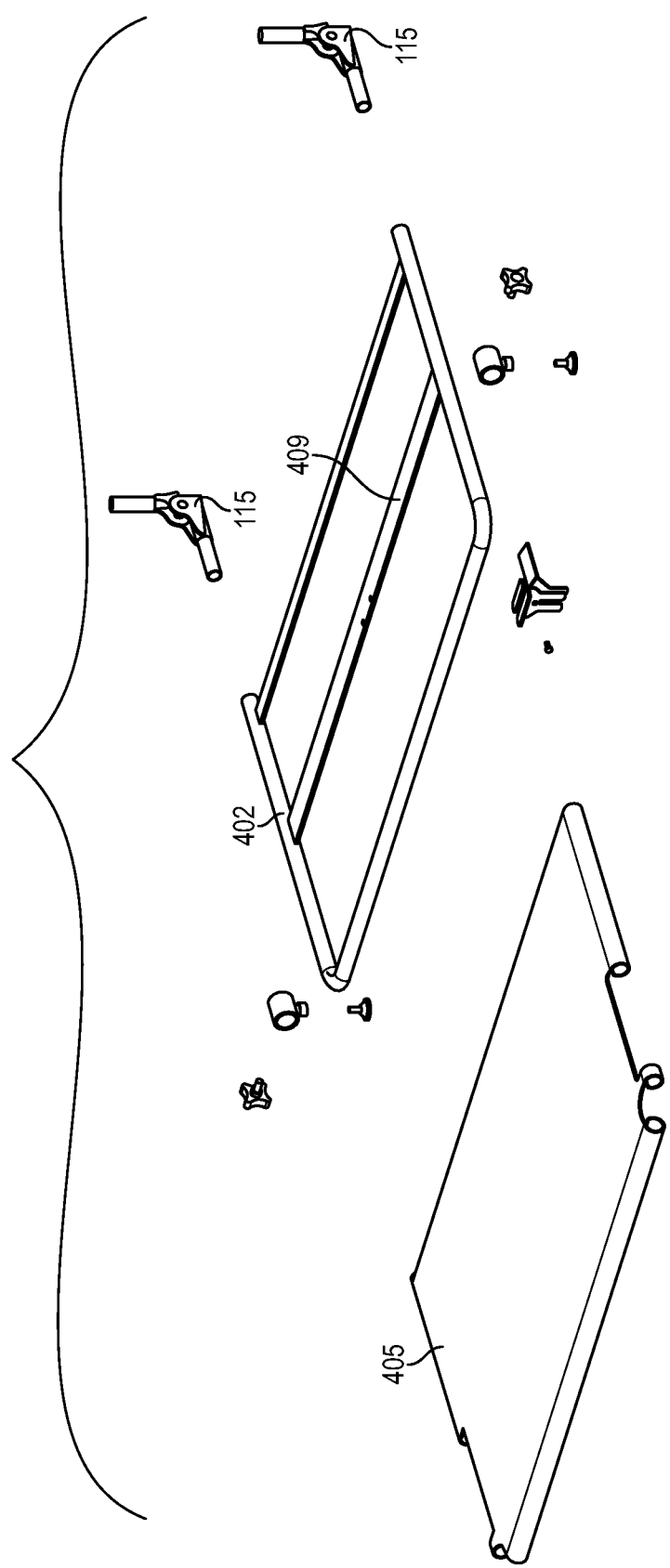
FIG. 4 illustrates an exploded view of an embodiment of a seat assembly.

FIG. 4 shows the seat assembly 108 may include a seat frame 402 and a seat 405, wherein the seat frame 402 may be of similar shape and composed of similar materials to the backrest frame 202, the seat 405 may be of similar shape and composed of similar materials to the backrest 206, and the seat frame 402 may be arranged to hold the seat 405, such as in a manner similar to the backrest frame 202 is arranged to hold the backrest 206. The seat frame 402 may include a slat 409 that is connected to the seat frame 402 on two sides of the seat frame 402, which is intended to help support the weight of a user. For instance, the slat 409 could connect on a first side of the seat frame 402 and on a second side of the seat frame 402. The slat 409 could be composed of similar material to the seat frame 402, or any material of strength to distribute the weight of the user to the seat frame 402. The slat 409 may be welded to seat frame. The seat assembly 108 may also include a tube connector hinge 413, wherein the tube connector hinge 413 may include a connection point on a closer end for connecting with the seat frame 108 and a connection point on a farther end for connecting with the backrest frame 202. For example, where the connection point for the tube connector hinge 413 is a mateable tube, the tube connector hinge 413 may attach to the seat frame 402 by a tube of one member sliding into a tube of the other member, such as the closer end of the connector hinge 413 may slide into an end of the seat frame 402. The tube connector hinge 413 may attach similarly on the farther end of the tube connector hinge 413 to the backrest frame 202, such that the farther end of the tube connector hinge 413 may slide into an end of the backrest frame 202. It is considered that the nesting arrangement may be reversed, such that, for example, the backrest frame 202 may slide into the tube connector hinge 413. Other means of attachment between the frames and the tube connector hinge 413 may be suitable, such as, for example, welded connections between the tube connector hinge 413 and the seat frame 402. The connector hinge 115 may allow radial motion of the bench back assembly 104 relative to the seat assembly 108 in one or more degrees of freedom.

Figure 5:
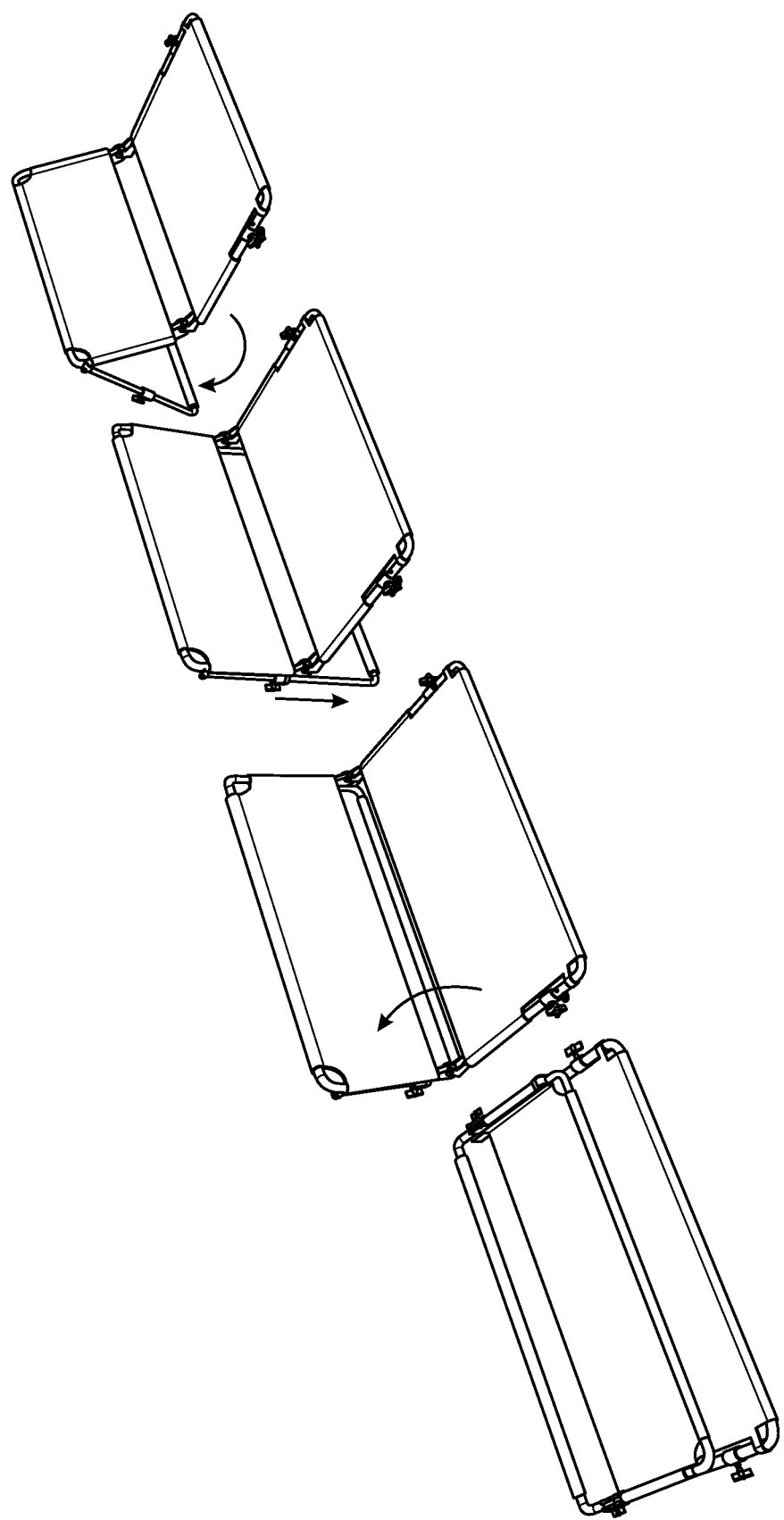
FIG. 5 illustrates the process of configuring the seat assembly from a closed position into an open position that is ready for use.

FIG. 5 shows an example of the operation of opening the foldable seating vehicle assembly 100. In FIG. 5, the foldable seating assembly vehicle 100 is first shown in a closed position such that the bench back assembly 104 and the seat assembly 108 are in their most proximal positions, and the bench back assembly 104 may be substantially parallel to the seat assembly 108. The foldable seating vehicle assembly 100 may be opened for use by rotating the bench back assembly 104 out from the seat assembly 108 such that the angle formed by the tube connector hinge 115 increases. The tube connector hinge 115 may lock when the bench back assembly 104 has reached a desired position in order to maintain the position of the bench back assembly 104 relative to the seat assembly 108. The tube connector hinge 115 may be capable of locking in any of several positions, such that the angle of the of the backrest assembly relative to the seat assembly when locked may be selected by the user and may be based on predetermined locked angles allowed by the tube connector hinge 115. The rear support 112 may then be extended to a desired length. The desired length may be a length necessary to allow the rear support 112 to rest on the floor of the trunk when the backrest assembly 104 is at a desired angle relative to the seat assembly 108. For instance, the rear support 112 may be extended until the rear support 112 comes into contact with the floor of the trunk, at which point the length of the rear support 112 may be fixed. The rear support 112 may be rotated outward from the backrest assembly 104 from an initial position, such as substantially parallel to the backrest assembly 104. When the rear support 112 has been adjusted to a desired angle relative to the backrest assembly 104, the hinge joint may lock so as to secure the position of the rear support 112 by maintaining the angle between the rear support 112 and backrest assembly 104 when the foldable seating vehicle accessory 100 is used. The order of the opening operation may be adjusted without straying from the inventive concept such as, for example, rotating the rear support 112 outward from the backrest assembly 104 prior to extending the length of the rear support 112.

Figure 6:
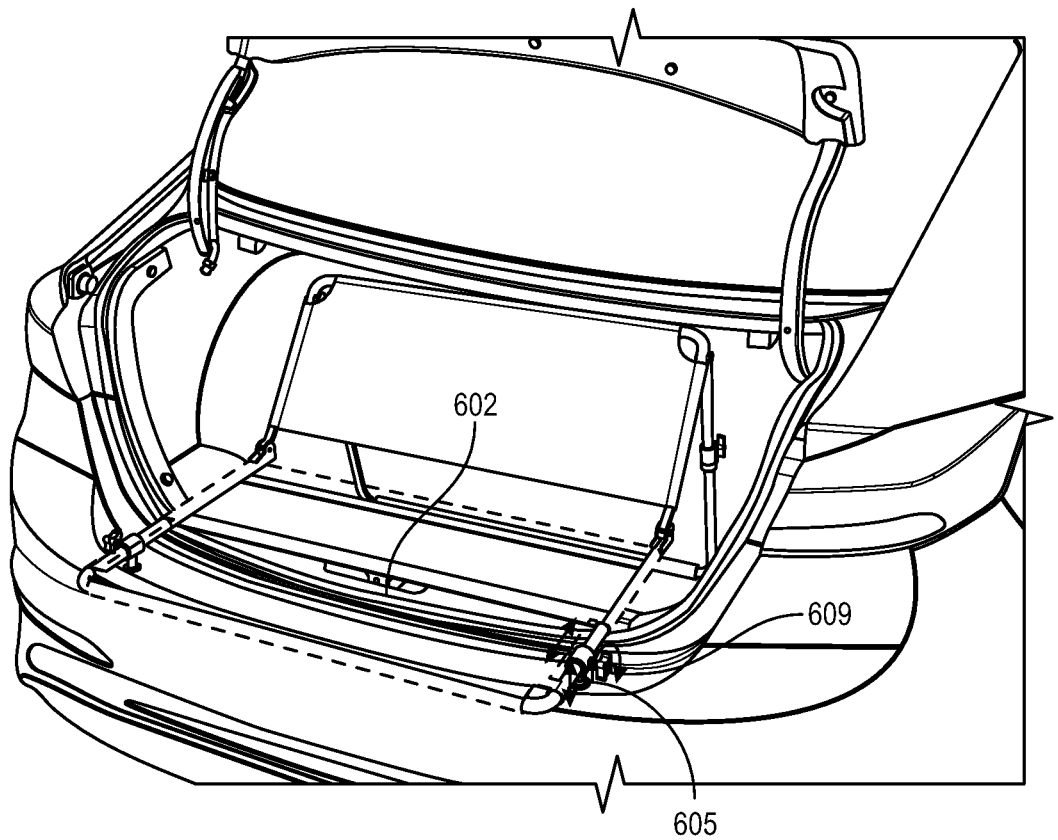
FIG. 6 illustrates a perspective view of an embodiment in a closed position that is stowed in a vehicle trunk.

The foldable seating vehicle accessory 100 may be configured to fit within the trunk of a vehicle, as demonstrated in FIG. 6. The seat 405 is not shown in this illustration in order to provide greater clarity of the operation of the foldable seating vehicle accessory 100. The foldable seating vehicle accessory 100 may include a means for securing the position of the foldable seating vehicle accessory 100 within the trunk during operation, so as to provide a stable and safe seating surface. For instance, the foldable seating vehicle accessory may include a means for attaching to the vehicle. An example is a trunk latch 602 that may be connected to the underside of the seat assembly 108. In many vehicles, the trunk door may hinge open or shut from an attachment point with the vehicle. When the trunk door is closed, a locking mechanism on the trunk door may engage with a paired locking mechanism that is located on the vehicle, such as on an inner portion of a lip of the trunk. The locking mechanism generally consists of a variation on a latch or hasp lock, such that there is a static rigid member that is U-shaped and an associated locking member that is capable of fastening to the U-shaped member, such as by the locking member straddling the U-shaped member and inserting a springed rigid member through the center of the "U." In many vehicles, the U-shaped member is located on the inner portion of the lip of the trunk.

In an embodiment, the trunk latch 602 is a locking member, such as a clip, designed to fasten to the rigid member of the vehicle trunk lock located on the lip of the trunk. Many vehicles use a standard trunk lock configuration, and so the trunk latch may be configured to pair with the standard trunk lock configuration. In this case, the trunk latch 602 may resemble the locking member located on the trunk door of the vehicle. In an embodiment, the foldable seat accessory may include a plurality of trunk latch attachments, wherein each trunk latch attachment may be pairable with a specific type of trunk lock associated with a vehicle make. A user may select a trunk latch attachment from the plurality of trunk latch attachments that best pairs with the trunk lock of the user's vehicle. The selected trunk latch attachment may be attached to the foldable seat accessory, wherein it may be operated to connect to the user's vehicle when the foldable seat accessory is in use, such that when the trunk latch attachment is connected to the user's vehicle the position of the foldable seat assembly within the vehicle is substantially fixed.

The trunk latch may be attached to the slat 409. In an embodiment, the position of the slat 409 may be adjustable in order to best fit the foldable seat accessory within the trunk. The position of the trunk latch 602 on the slat 409 may also be adjustable for the same purpose.

The padded foot 121 may be adjustable in position and height. For instance, the padded foot 121 may include an extendable cushion 605 that acts as a buffer between a bumper of the vehicle and the seat frame 402 of the seat assembly 108. The extendable cushion 605 may vary in height, such as, for instance, through a screwing mechanism where in rotating the extendable cushion 605 in a first direction may increase the height of the extendable cushion 605 relative to the seat frame 402 and rotating the extendable cushion 605 in a second direction may decrease the height of the extendable cushion 605. The position of the padded foot 121 may be adjusted as well, such as by sliding the padded foot 121 on the seat frame 402. For instance, the padded foot 121 may include a dial 609 that when turned in a first direction tightens the grip of the padded foot 121 on the seat frame 402 and when turned in a second direction loosens the grip of the padded foot 121 on the seat frame 402. If a user wishes to adjust the position of the padded foot 121, such as to locate it above the bumper of the vehicle, the user may operate the dial 609 so as to loosen the grip of the padded foot 121 on the seat frame 121, slide the padded foot to the desired location, and operate the dial 609 so as to tighten the grip of the padded foot 121 on the seat frame 402 sufficiently to prevent further movement of the padded foot 121.

Figure 7A:
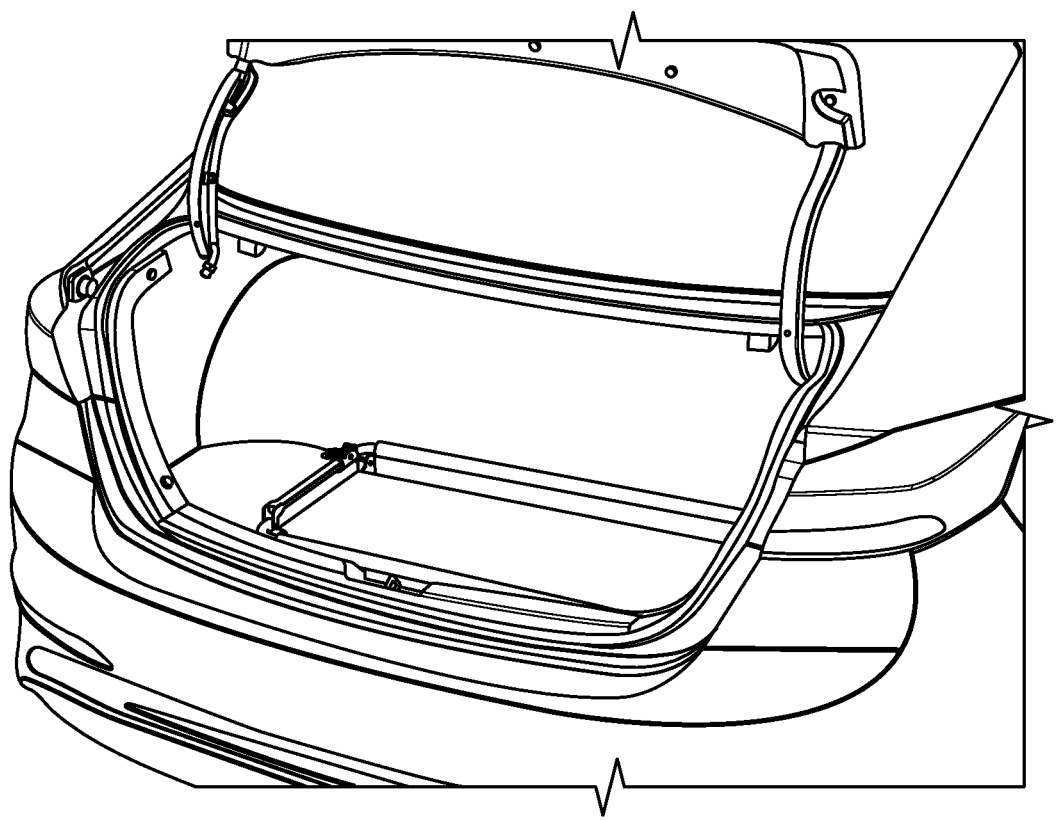
FIG. 7a illustrates a perspective view of an embodiment in an open position within a vehicle trunk.
Figure 7B:
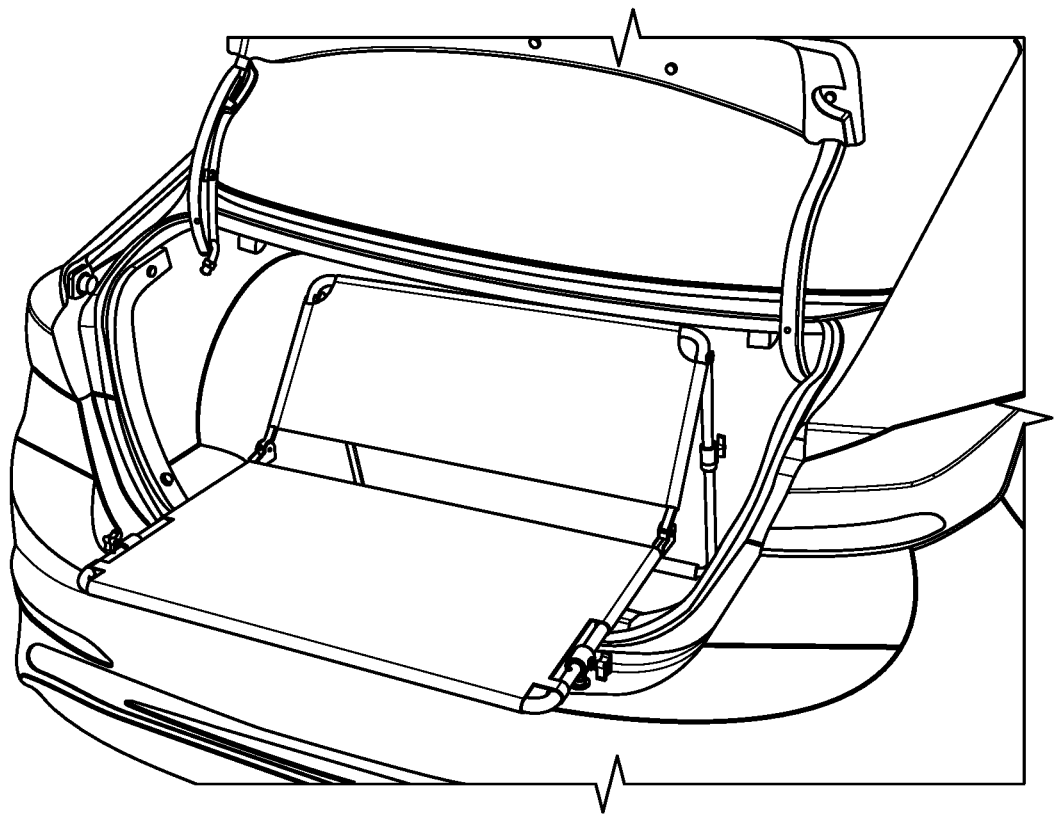
FIG. 7b illustrates a perspective view of an embodiment in a secured position within a vehicle trunk.

FIG. 7(a-b) demonstrates how the foldable seating vehicle accessory 100 may be implemented within the trunk of a vehicle. In FIG. 7(a), the foldable seat accessory 100 is in a closed position, such that the foldable seating vehicle accessory 100 may be compressed so that the foldable seating vehicle accessory 100 may lay substantially flat within the trunk. In FIG. 7(b), the foldable seating vehicle accessory 100 is in an open position, such that the position of the foldable seating vehicle accessory 100 is substantially locked in an operational mode that allows a user to use the foldable seating vehicle accessory 100 as a seat within the trunk of the vehicle while the foldable seating vehicle accessory 100 distributes the weight across the different facets of the vehicle.

While certain aspects have been described and shown in the accompanying drawings, it is to be understood that such are merely illustrative of and not restrictive on the broad invention, and that the invention is not limited to the specific constructions and arrangements shown and described, since various other modifications may occur to those of ordinary skill in the art. For example, while FIG. 2 depicts a device in which the backrest frame is a three-sided u-shape, it is also possible to have a frame that is constructed to be circular. The description is thus to be regarded as illustrative instead of limiting.

What is claimed is:

1. A foldable seating accessory for a vehicle, comprising:
    a backrest assembly comprising a backrest frame arranged to secure a backrest;
    a seat assembly comprising a seat frame arranged to secure a seat, wherein the seat assembly is connected to the backrest assembly by a hinge joint such that the backrest assembly can hinge relative to the seat assembly;
    a rear support comprising a structural support member, wherein the rear support is connected to the backrest assembly; and
    a trunk latch connected to the seat assembly, wherein the trunk latch connects to the vehicle, and wherein the trunk latch is one of a plurality of trunk latches that may be interchangeably fastened to the seat assembly, wherein each of the plurality of trunk latches interface with a different style of trunk locking mechanism.

2. The foldable seating accessory for a vehicle of claim 1, further comprising a hinge joint that connects the rear support to the backrest assembly such that the rear support and the backrest assembly are connected in a manner that allows the rear support to hinge relative to the backrest assembly.

3. The foldable seating accessory for a vehicle of claim 1, further comprising a padded foot attached to the seat assembly.

4. The foldable seating accessory for a vehicle of claim 3, wherein the padded foot includes a dial that when operated in a first direction secures the padded foot to the seat frame and when operated in a second direction releases the padded foot from the seat frame.

5. The foldable seating accessory for a vehicle of claim 3, wherein the padded foot includes an extendable cushion that when operated in a first direction increases the distance between the extendable cushion and the seat frame and when operated in a second direction decreases the distance between the extendable cushion and the seat frame.

6. The foldable seating accessory for a vehicle of claim 1, wherein the rear support comprises a leg tube, an extension tube, and a telescoping tube connector, such that the telescoping tube connector interfaces between the leg tube and extension tube, that when the telescoping tube connector is activated allows the extension tube to be variably positioned relative to the leg tube such that the length of the extension tube that is positioned inside of the leg tube may be changed, and when inactivated prevents motion of the extension tube relative to the leg tube.

7. The foldable seating accessory for a vehicle of claim 1, wherein the trunk latch is comprised of a locking member designed to fasten to a rigid member of a vehicle trunk lock located on the lip of a vehicle trunk.

8. The foldable seating accessory for a vehicle of claim 7, wherein the trunk latch is a clip.

9. A foldable seating accessory for a vehicle, comprising: a chair assembly configured to support the weight of a user; a support structure connected to the chair assembly configured to transmit the weight of the user from the chair assembly to a vehicle trunk; a means for attaching the foldable seating accessory to the vehicle; and a padded foot attached to the chair assembly, wherein the padded foot includes a means for adjusting the position of the padded foot relative to the chair assembly.

10. The foldable seating accessory for a vehicle of claim 9, further comprising a means for connecting the chair assembly to the support structure such that the support structure can hinge relative to the chair assembly.

11. The foldable seating accessory for a vehicle of claim 9, wherein the position of the padded foot relative to the chair assembly includes the distance between the padded foot and the chair assembly.

12. The foldable seating accessory for a vehicle of claim 9, wherein the support structure includes a means for adjusting and fixing the length of the support structure.

13. A foldable seating accessory for a vehicle, comprising:
    a backrest assembly comprising a backrest frame arranged to secure a backrest;
    a seat assembly comprising a seat frame arranged to secure a seat, wherein the seat assembly is connected to the backrest assembly by a hinge joint such that the backrest assembly can hinge relative to the seat assembly;
    a rear support comprising a structural support member, wherein the rear support is connected to the backrest assembly;
    a trunk latch connected to the seat assembly, wherein the trunk latch connects to the vehicle; and
    a padded foot attached to the seat assembly, wherein the padded foot includes an extendable cushion that when operated in a first direction increases the distance between the extendable cushion and the seat frame and when operated in a second direction decreases the distance between the extendable cushion and the seat frame.

14. The foldable seating accessory for a vehicle of claim 13, further comprising a hinge joint that connects the rear support to the backrest assembly such that the rear support and the backrest assembly are connected in a manner that allows the rear support to hinge relative to the backrest assembly.

\* \* \* \* \*